(12) United States Patent
Jung et al.

(10) Patent No.: US 11,500,918 B2
(45) Date of Patent: Nov. 15, 2022

(54) ELECTRONIC DEVICE FOR PROVIDING INFORMATION ON ITEM BASED ON CATEGORY OF ITEM

(71) Applicant: Samsung Electronics Co., Ltd., Gyeonggi-do (KR)

(72) Inventors: Yumin Jung, Gyeonggi-do (KR); Jonghwa Yim, Gyeonggi-do (KR); Sungho Lee, Gyeonggi-do (KR); Suhyung Kim, Gyeonggi-do (KR); Junghoon Kim, Gyeonggi-do (KR); Daekyu Shin, Gyeonggi-do (KR); Kwangyong Lim, Gyeonggi-do (KR); Jiyoon Park, Gyeonggi-do (KR); Jungeun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 16/532,641

(22) Filed: Aug. 6, 2019

(65) Prior Publication Data

US 2020/0050626 A1 Feb. 13, 2020

(30) Foreign Application Priority Data

Aug. 8, 2018 (KR) .......................... 10-2018-0092717

(51) Int. Cl.
*G06F 16/532* (2019.01)
*G06F 16/2457* (2019.01)
(Continued)

(52) U.S. Cl.
CPC ...... *G06F 16/532* (2019.01); *G06F 16/24578* (2019.01); *G06F 16/51* (2019.01);
(Continued)

(58) Field of Classification Search
CPC ................. G06F 16/58; G06F 16/5854; G06F 16/24578; G06F 16/51; G06F 16/532;
(Continued)

(56) References Cited

U.S. PATENT DOCUMENTS

| 8,949,252 B2 | 2/2015 | Chittar et al. |
| 9,665,894 B2 | 5/2017 | Kumazawa et al. |

(Continued)

FOREIGN PATENT DOCUMENTS

| KR | 10-2016-0064259 A | 6/2016 |
| KR | 10-2017-0026264 A | 3/2017 |

(Continued)

OTHER PUBLICATIONS

International Search Report dated Nov. 29, 2019.

*Primary Examiner* — Kuen S Lu
(74) *Attorney, Agent, or Firm* — Cha & Reiter, LLC

(57) ABSTRACT

Electronic devices are disclosed. A first device stores items, parent categories, images, child categories and product information for each item. The first device receives a search image from a second device, determines a parent category and a child category of the search item, identifies a first database from among the databases matching the determined parent category of the search item, when the child category is determined, identifies a subset of the stored items corresponding the first database that match the search image based on at least one feature of the received search image and the determined child category of the received search image, and transmits information on the identified subset of the stored items to the external electronic device. The second device transmits the image of a first item to the first device, and receives a transmission indicating one or more second items matching the transmitted image for display.

9 Claims, 12 Drawing Sheets

(51) Int. Cl.
  *G06F 16/51* (2019.01)
  *G06F 16/583* (2019.01)
  *G06F 16/9535* (2019.01)
  *G06K 9/62* (2022.01)
  *G06Q 30/02* (2012.01)
  *G06V 10/40* (2022.01)
  *G06V 10/75* (2022.01)

(52) U.S. Cl.
  CPC ...... *G06F 16/5838* (2019.01); *G06F 16/5854* (2019.01); *G06F 16/9535* (2019.01); *G06K 9/6215* (2013.01); *G06Q 30/0283* (2013.01); *G06V 10/40* (2022.01); *G06V 10/751* (2022.01); *G06V 2201/09* (2022.01)

(58) Field of Classification Search
  CPC ............ G06F 16/9535; G06F 16/5838; G06K 2209/25; G06K 9/46; G06K 9/6215; G06K 2209/27; G06Q 30/0283; G06V 2201/09; G06V 10/751; G06V 10/40
  USPC .......................................................... 707/772
  See application file for complete search history.

(56) References Cited

U.S. PATENT DOCUMENTS

| | | | |
|---|---|---|---|
| 2002/0026386 | A1* | 2/2002 | Walden .............. G06Q 30/0641 705/26.8 |
| 2007/0293961 | A1* | 12/2007 | Ikuzawa ................... B09B 3/00 705/330 |
| 2011/0314031 | A1 | 12/2011 | Chittar et al. |
| 2012/0259701 | A1 | 10/2012 | Kumazawa et al. |
| 2013/0101223 | A1* | 4/2013 | Kawanishi ............. H04N 5/772 382/195 |
| 2017/0228400 | A1 | 8/2017 | Kumazawa et al. |
| 2018/0159914 | A1* | 6/2018 | Zamaraiev ............ H04L 65/762 |
| 2018/0204111 | A1* | 7/2018 | Zadeh .................. G06N 3/0436 |
| 2019/0012716 | A1* | 1/2019 | Murakami ........... G06K 9/6215 |

FOREIGN PATENT DOCUMENTS

| | | |
|---|---|---|
| KR | 10-1768521 B1 | 8/2017 |
| KR | 10-2018-0051448 A | 5/2018 |

\* cited by examiner

ELECTRONIC DEVICE FOR PROVIDING INFORMATION ON ITEM BASED ON CATEGORY OF ITEM

CROSS-REFERENCE TO RELATED APPLICATION(S)

This application is based on and claims priority under 35 U.S.C. § 119 to Korean Patent Application No. 10-2018-0092717 filed on Aug. 8, 2018, in the Korean Intellectual Property Office, the disclosure of which is incorporated by reference herein its entirety.

BACKGROUND

1. Field

The disclosure relates to a technology for providing information on an item and generating a database including the information on an item.

2. Description of Related Art

Image recognition technology is a service that searches for similar images using not only a text but also images. The service may provide image search results and also the shopping information associated with an image search result.

It is difficult for an image search service to search for an image that a user desires, using other types of information besides the image itself, such as a time at which an image is obtained, a place where the image was captured, or other qualities such as a degree of illumination, or the like. Accordingly, the user may not always be able to conduct a successful image search.

The above information is presented as background information only to assist with an understanding of the disclosure. No determination has been made, and no assertion is made, as to whether any of the above might be applicable as prior art with regard to the disclosure.

SUMMARY

Conventional image search strategies require the large amounts of computation to search for matching images and metadata associated with an image, being limited to executing a search based primarily on a similarity of the image.

Various embodiments of the disclosure may improve search performance by classifying the category of an item to reduce the search range according to the category.

Furthermore, certain embodiments of the disclosure may increase the accuracy of the search result by assigning the priority of an image found using the attribute of an item.

Moreover, certain embodiments of the disclosure may store information on the item received from an external server in which the category system is different, depending on the pre-specified category system, by generating a database (DB) including information on an item in the various manners.

Aspects of the disclosure are to address at least the above-mentioned problems and/or disadvantages and to provide at least the advantages described below.

In accordance with an aspect of the disclosure, an electronic device may include a communication interface, a memory including databases storing items, the databases classified by parent categories, the databases further storing images of each of the stored items, child categories for each of the stored items, and product information on each of the stored items, and at least one processor electrically coupled to the communication interface and the memory, configured to receive a search image of a search item from an external electronic device through the communication interface, determine a parent category and a child category of the search item, using the received search image of the search item, identify a first database from among the databases matching the determined parent category of the search item, when the child category is determined, identify a subset of the stored items corresponding the first database that match the search image based on at least one feature of the received search image and the determined child category of the received search image, and transmit information on the identified subset of the stored items to the external electronic device.

In accordance with another aspect of the disclosure, an electronic device may include a communication interface, a memory storing a database, at least one processor electrically coupled to the communication interface and the memory, the at least one processor configured to: receive, through the communication interface, a text corresponding to an item, category information for the item, and an image of the item from an external electronic device, execute a first determination method on the text corresponding to the item to determine a category of the item, when the first determination method fails to identify a category of the item, execute a second determination method on the received category information for the item to determine the category of the item, when the second determination method fails to identify the category of the item, execute a third determination method on the image of the item to determine the category of the item, and when the category of the item is determined, store the item in the database including the determined category of the item.

In accordance with another aspect of the disclosure, an electronic device may include a communication circuit, a camera module, a memory, a display, and at least one processor electrically coupled to the communication circuit, the camera module, the memory, and the display, wherein the at least one processor is configured to: transmit an image of a first item to an external server through the communication circuit, wherein the image of the first item is captured through the camera module, or previously stored in the memory, receive, via the communication circuit, a transmission from the external server, the transmission including information corresponding to one or more second items matching the transmitted image, and display the information corresponding to the one or more second items on the display, wherein the one or more second items are selected as matches for the transmitted image by the external server from among a plurality of second items stored on the external server, based on a parent category of the first item, a child category of the first item, and an extracted feature of the first item as depicted in the image.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the disclosure.

Figure 1:
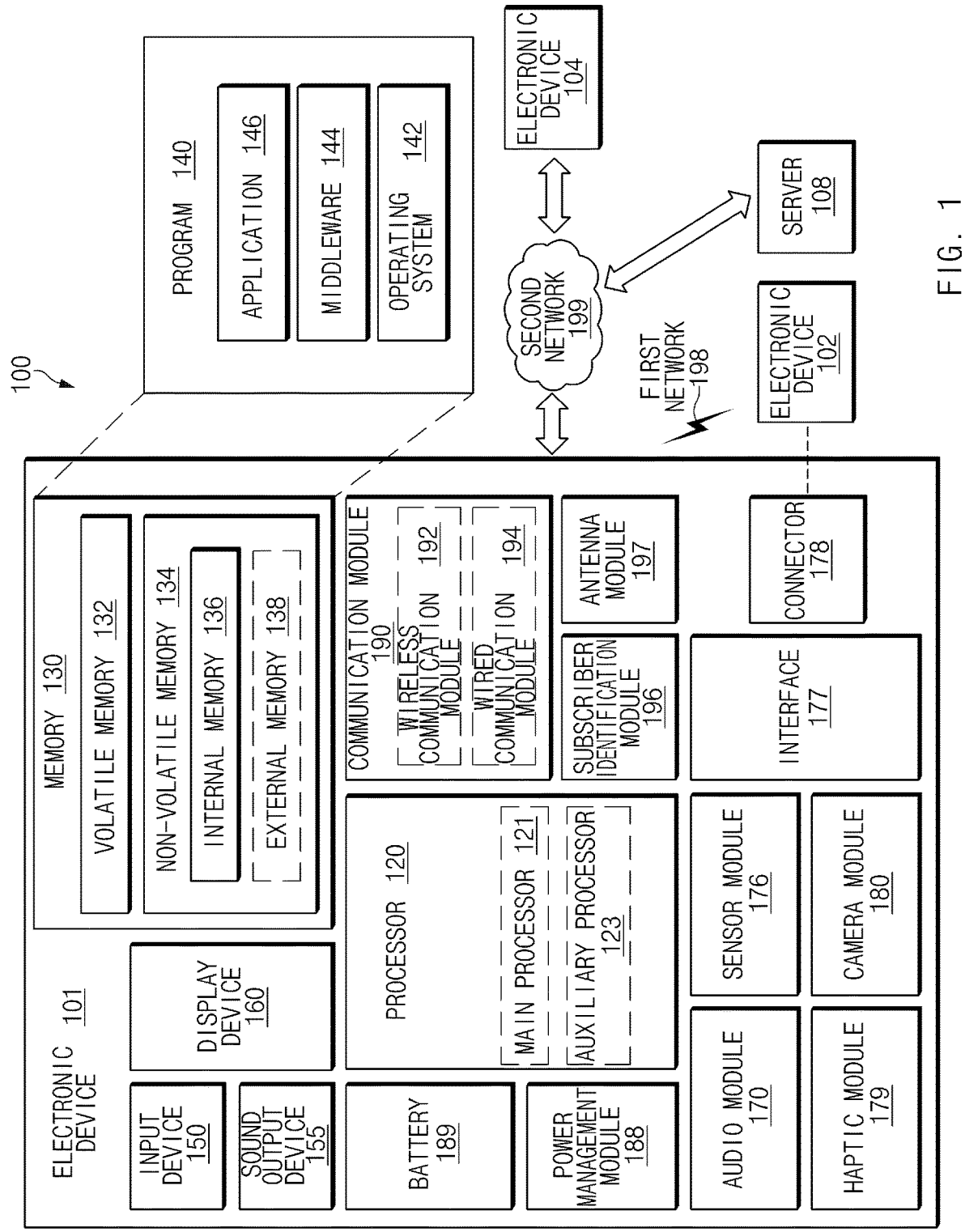
FIG. 1 is a block diagram of an electronic device in a network environment, according to certain embodiments.

FIG. 1 is a block diagram of an electronic device 101 in a network environment 100, according to certain embodiments. Referring to FIG. 1, the electronic device 101 in the network environment 100 may communicate with an electronic device 102 over a first network 198 (e.g., a short range wireless communication) or may communicate with an electronic device 104 or a server 108 over a second network 199 (e.g., a long range wireless communication). The electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. In any embodiment, the electronic device 101 may not include at least one (e.g., the display device 160 or the camera module 180) of the above-described components or may further include one or more other components. In any embodiment, some of the components may be implemented as a single integrated circuit. For example, the sensor module 176 (e.g., a fingerprint sensor, an iris sensor, or an illuminance sensor) may be implemented while being embedded in the display device 160 (e.g., a display).

For example, the processor 120 may execute software (e.g., a program 140) to control at least another component (e.g., hardware or software component) of the electronic device 101 connected to the processor 120, and may process and calculate various types of data. According to an embodiment, as at least part of data processing or calculation, the processor 120 may load commands or data received from other components (e.g., the sensor module 176 or the communication module 190) into a volatile memory 132, may process commands or data stored in the volatile memory 132, and may store the result data in a nonvolatile memory 134. According to an embodiment, the processor 120 may include a main processor 121 (e.g., a central processing unit or an application processor) and an auxiliary processor 123 (e.g., a graphic processing unit, an image signal processor, a sensor hub processor, or a communication processor) capable of operating independently or together with the main processor. Additionally or alternatively, the auxiliary processor 123 may use lower power than main processor 121 or may be configured to be specialized to a specified function. The auxiliary processor 123 may be implemented separately from the main processor 121 or as part of the main processor 121.

For example, the auxiliary processor 123 may control at least part of the functions or states associated with at least one (e.g., the display device 160, the sensor module 176, or the communication module 190) of the components of the electronic device 101, instead of the main processor 121 while the main processor 121 is in an inactive (e.g., sleep) state or together with the main processor 121 while the main processor 121 is in an active (e.g., the execution of an application) state. According to an embodiment, the auxiliary processor 123 (e.g., an image signal processor or a communication processor) may be implemented as a part of an operatively associated other components (e.g., the camera module 180 or the communication module 190).

The memory 130 may store various pieces of data used by at least one component (e.g., the processor 120 or the sensor module 176) of the electronic device 101. For example, data may include software (e.g., the program 140) and input data or output data for commands associated with the software. The memory 130 may include, for example, the volatile memory 132 or the nonvolatile memory 134.

The program 140 may be stored as software in the memory 130 and may include, for example, an operating system 142, a middleware 144, or an application 146.

The input device 150 may receive instructions or data to be used for the component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for a general purpose, such as multimedia play or recording play, and the receiver may be used to receive an incoming call. According to an embodiment, the receiver may be implemented separately from the speaker or may be implemented as a part of the speaker.

The display device 160 may visually provide information to the outside (e.g., the user) of the electronic device 101. The display device 160 may include, for example, a display, a hologram device, a projector, or a control circuit for controlling a corresponding device. According to an embodiment, the display device 160 may include a touch circuitry configured to sense a touch, or a sensor circuitry (e.g., a pressure sensor) configured to measure the strength of force generated by the touch.

The audio module 170 may convert sound to an electrical signal, or reversely, may convert an electrical signal to sound. According to an embodiment, the audio module 170 may obtain sound through the input device 150, or may output sound through the sound output device 155, or through an external electronic device (e.g., the electronic device 102) (e.g., a speaker or a headphone) directly or wirelessly connected with the electronic device 101.

The sensor module 176 may sense an operation state (e.g., power or a temperature) of the electronic device 101 or an external environment state (e.g., a user state), and may generate an electrical signal or a data value corresponding the sensed state. According to an embodiment, the sensor module 176 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols that may be used to directly and wirelessly connect the electronic device 101 with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

A connecting terminal 178 may include a connector that may allow the electronic device 101 to be physically connected with an external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal to a mechanical stimulation (e.g., vibration or movement) or an electrical stimulation which the user may perceive through the sense of touch or the sense of movement. According to an embodiment, the haptic module 179 may include, for example, a motor, a piezoelectric sensor, or an electrical stimulation device.

The camera module 180 may photograph a still image and a video. According to an embodiment, the camera module 180 may include one or more lenses, image sensors, image signal processors, or flashes (or electrical flashes).

The power management module 188 may manage the power which is supplied to the electronic device 101. According to an embodiment, the power management module 188 may be implemented, for example, as at least part of a power management integrated circuit (PMIC).

The battery 189 may power at least one component of the electronic device 101. According to an embodiment, the battery 189 may include, for example, a primary cell not rechargeable, a secondary cell rechargeable, or a fuel cell.

The communication module 190 may establish a direct (or wired) communication channel or a wireless communication channel between the electronic device 101 and an external electronic device (e.g., the electronic device 102, the electronic device 104, or the server 108) and may perform communication through the established communication channel. The communication module 190 may include one or more communication processors which are operated independently of the processor 120 (e.g., an application processor) and supports direct (or wired) communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). A corresponding communication module of such communication modules may communicate with an external electronic device over the first network 198 (e.g., a short range communication network such as Bluetooth, Wi-Fi direct, or infrared data association (IrDA)) or the second network 199 (e.g., a long range communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 192 may verify and authenticate the electronic device 101 within a communication network, such as the first network 198 or the second network 199, by using subscriber information (e.g., international mobile subscriber identity (IMSI)) stored in the subscriber identification module 196.

The antenna module 197 may transmit a signal or a power to the outside (e.g., an external electronic device) or may receive a signal or a power from the outside. According to an embodiment, the antenna module may include one antenna including a radiator made of a conductor or a conductive pattern formed on a substrate (e.g., a PCB). According to an embodiment, the antenna module 197 may include a plurality of antennas. In this case, at least one antenna suitable for a communication scheme used in a communication network such as the first network 198 or the second network 199 may be selected, for example, by the communication module 190 from the plurality of antennas. The signal or power may be exchanged between the communication module 190 and an external electronic device through the selected at least one antenna or may be received from the external electronic device through the selected at least one antenna and the communication module 190. According to any embodiment, another component (e.g., RFIC) in addition to the radiator may be further formed as the part of the antenna module 197.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 101 and the external electronic device 104 through the server 108 connected to the second network 199. Each of the electronic devices 102 and 104 may be a device of which the type is different from or the same as that of the electronic device 101. According to an embodiment, all or a part of operations to be executed in the electronic device 101 may be executed in one or more external devices of the external electronic devices 102, 104, or 108. For example, in the case where the electronic device 101 should perform any function or service automatically or in response to a request from the user or any other device, the electronic device 101 may request one or more external electronic devices to perform at least part of the function or service, instead of internally executing the function or service or additionally. The one or more external electronic devices which receive the request may execute at least part of the function or service thus requested or an additional function or service associated with the request, and may provide a result of the execution to the electronic device 101. The electronic device 101 may process received result as it is or additionally, and may provide a result of the processing as at least part of the response to the request. To this end, for example, a cloud computing, distributed computing, or client-server computing technology may be used.

Figure 2:
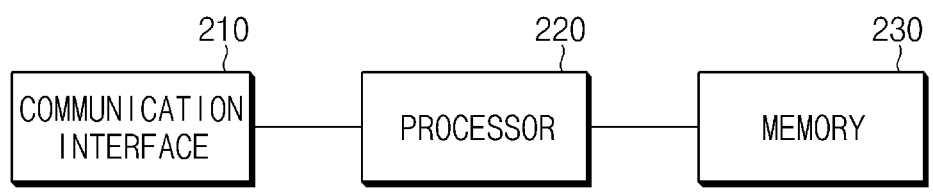
FIG. 2 illustrates a block diagram of an electronic device determining a category of an item, according to an embodiment.

FIG. 2 illustrates a block diagram of an electronic device determining a category of an item, according to an embodiment.

According to an embodiment, the electronic device of FIG. 2 may correspond to the electronic device 104 or the server 108 illustrated in FIG. 1.

According to an embodiment, the electronic device may include a communication interface 210, a processor 220, and a memory 230.

The communication interface 210 (e.g., the communication module 190) may support the communication execution between the electronic device and an external electronic device.

The processor 220 may be electrically connected to the communication interface 210 and the memory 230 and may control overall operations of the electronic device. Generally, the processor 220 may correspond to a processing circuit that controls other components electrically connected to the processor 220 in the electronic device and performs calculation.

The memory 230 may store commands, information, or data associated with operations of components included in the electronic device. For example, the memory 230 may store instructions which, when executed, cause the processor 220 to perform various operations described in the disclosure.

According to an embodiment, the memory 230 may store a plurality of DBs. According to an embodiment, each of the plurality of DBs may correspond to the parent category of a plurality of items. Each of the plurality of DBs may include feature data of an image of items, child category data of items, and information on items. Feature data may refer to "features" used for algorithmic detection and identification objects in an image or in a set of images, such as that implemented by Scale-Invariant Feature Transform (SIFT).

According to an embodiment, the memory 230 may further store keywords corresponding to the attribute information of an image and category information corresponding to the feature data of an image.

Figure 3:
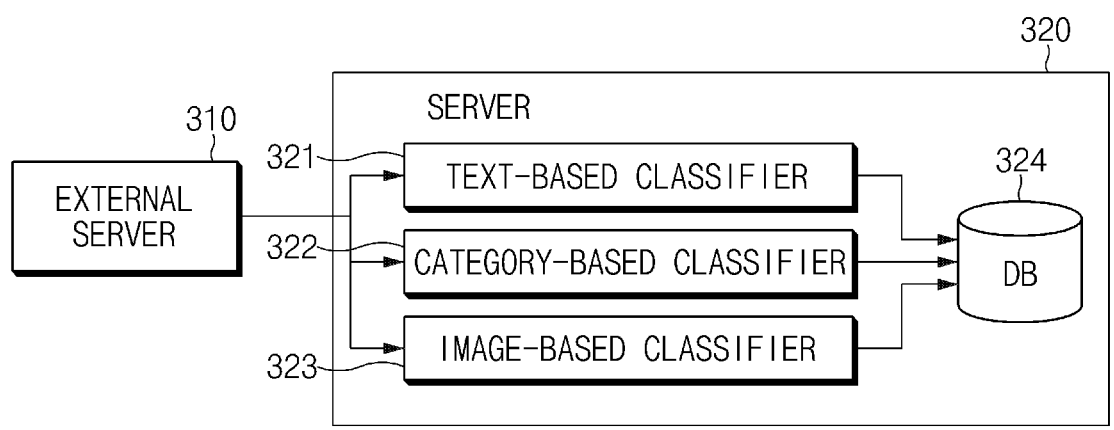
FIG. 3 is a block diagram illustrating a module of an electronic device for generating a DB, according to an embodiment.

FIG. 3 is a block diagram illustrating a module of an electronic device for generating a DB, according to an embodiment.

According to an embodiment, the processor 220 may implement various modules via execution of the instructions stored in the memory 230. For example, the processor 220 may include a text-based classifier 321, a category-based classifier 322, and an image-based classifier 323. Accordingly, it is understood that the operation performed by the modules 321 to 323 described below may be performed by the processor 220. However, in some embodiments, hardware implementations of the modules 321 to 323 may be utilized as well.

According to an embodiment, an electronic device 320 may receive a text (e.g., a text string) indicating or otherwise identifying a retail item, category information pertaining to the item, and an image of the item, from an external server 310 or an external electronic device. According to an embodiment, the external server 310 or the external electronic device may provide the text, categorical information, the image for the item. For example, the external server 310 or the external electronic device may represent one or more servers associated with Internet retailers.

The text for the retail item may include a name, model name, seller, sales link, price, parent category, child category, or the like of an item.

The category information for the item may include a category table utilized by the external server 310 or the external electronic device. For example, the category information on an item may be a category table used by an Internet retailer selling the item, and the category table may include a structure different from the category structure of a DB 324 of the electronic device 320.

The image of the retail item may be a photographic capture, or other visual representation of an item. For example, the image of the item may be an advertisement image utilized descriptions of a product in an Internet retailer.

The text-based classifier 321, the category-based classifier 322 and the image-based classifier 323 may determine the category of an item. According to an embodiment, the text-based classifier 321, the category-based classifier 322 and the image-based classifier 323 may determine the "parent" category of an item and the "child" category belonging to the parent category.

The text-based classifier 321 may determine one or more categories of an item, using a first determination method and a text indicating an item.

According to an embodiment, the first determination method may include a method of determining the category of an item as a first category when the text indicating an item includes a pre-specified first keyword associated with the first category, and a method of not determining the category of an item as the first category when the text indicating an item includes a pre-specified second keyword, which is not associated with the first category.

For example, the text indicating an item may be as follows:

<<<mapid>>>1563333717
<<<pname>>>Samsung genuine stand-type rapid wireless charger (EP-NG930B)
<<<price>>>47000
<<<coupo>>>0
<<<dlvcd>>>02
<<<deliv>>>2500
<<<pgurl>>>http://www.11st.co.kr/connect/Gateway.tmall?method=Xsite&prdNo=1563333717&tid=
<<<igurl>>>http://i.011st.com/t/300/an/3/3/3/7/1/7/1563333717_B.jpg
<<<cate1>>>Mobile phone
<<<cate2>>>Mobile phone charger
<<<cate3>>>Wireless charger
<<<caid1>>>1001429
<<<caid2>>>1002726
<<<caid3>>>1009568
<<<model>>>Genuine rapid wireless charging stand EP-NG930B
<<<brand>>>Samsung Electronics
<<<maker>>>Samsung The text-based classifier 321 may determine whether the text indicating an item includes "wireless" and "charger" that are keywords associated with a digital category being the parent category and the wireless charger being the child category. Moreover, the text-based classifier 321 may determine whether the text indicating an item includes "bag" being a keyword not associated with a digital category being the parent category and the wireless charger being the child category. In the example, because the text indicating an item includes "wireless" and "charger", the text-based classifier 321 may determine the parent category of the item as "digital" and may determine the child category as "wireless charger". Also, because the text indicating an item does not include "bag", the text-based classifier 321 may not determine the category of the item as "fashion".

The category-based classifier 322 may determine the category of an item, using the second determination method and the received category information on an item.

According to an embodiment, the second determination method may be a method of determining the category of an item as the corresponding category of the pre-specified item when a text included in the received category information on an item corresponds to the category of the pre-specified item.

For example, when the received category metadata information on an item is 'clothing, Men's shirts, a T-shirt and a flower pattern', the category-based classifier 322 may determine the parent category of an item to be a 'top' and may determine the child category of an item as 't-shirts'. For another example, when the received category information on an item is 'clothing, sports clothing, a training suit set and a stripe pattern', the category-based classifier 322 may determine the parent category of an item as 'top' or 'pants' and may determine the child category as 'set'.

The image-based classifier 323 may determine the category of an item, using the third determination method and the image of an item.

According to an embodiment, the third determination method may be a method of extracting feature data of an image of an item and then determining the category of an item, using category information corresponding to the feature data of an image stored in the memory 230 and the extracted feature data of an image.

The processor 220 may extract the feature data of an image and attribute information of an image, using the received image.

The processor 220 may generate the DB 324 including information on the category of an item that the text-based classifier 321, the category-based classifier 322, and the image-based classifier 323 determines, the extracted feature data of an image, and the attribute information of an image.

According to an embodiment, the generated DB 324 may correspond to the parent category determined by each classifier. According to an embodiment, when there are a plurality of parent categories determined by each classifier, the processor 220 may generate the plurality of DBs 324 corresponding to a plurality of parent categories. Each of the DBs 324 may include feature data of an image of items, child category data of items, and information on items. The processor 220 may store the generated DB 324 in the memory 230 of the electronic device 320 or may transmit the generated DB 324 to the external server 310.

Figure 4:
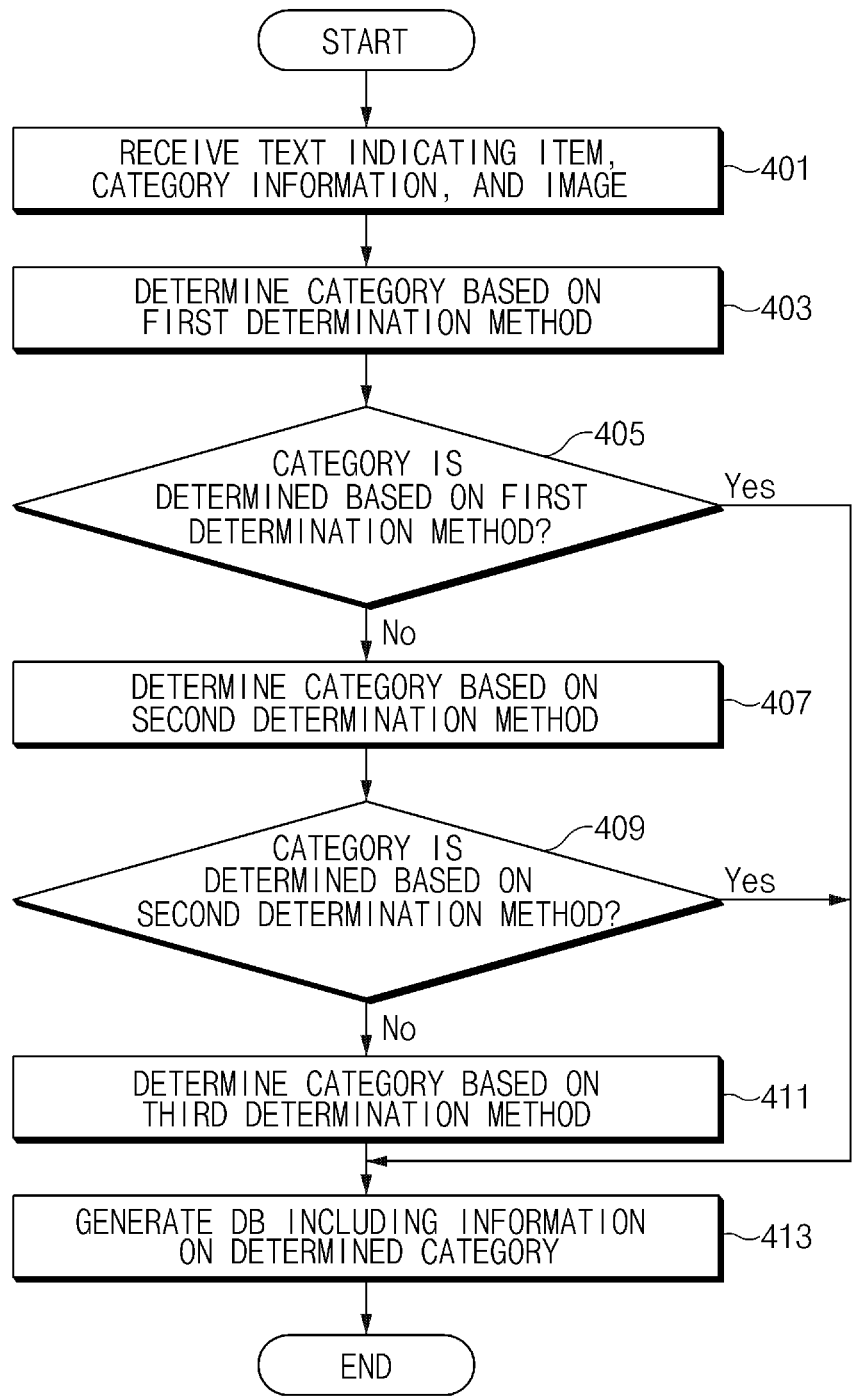
FIG. 4 is a flowchart illustrating a method in which an electronic device generates a DB including a category of an item, according to an embodiment.

FIG. 4 is a flowchart illustrating a method in which an electronic device generates a DB including a category of an item, according to an embodiment.

Hereinafter, it is assumed that an electronic device (e.g., the electronic device 104 or the server 108) of FIG. 2 performs the process of FIG. 4. The operation is described as performed by the electronic device, and may be implemented with instructions executable by the processor 220 of the electronic device. The instructions may be stored in, for example, a computer-readable recording medium or the memory 230 of the electronic device illustrated in FIG. 2. Furthermore, it may be understood that the operations of FIG. 4 are performed by the above-described classifiers 321 to 323 (e.g., modules) illustrated in FIG. 3.

In operation 401, the processor 220 may receive a text information indicating an item, including metadata such as category information on the item, and an image of the item, as received from an external electronic device through the communication interface 210.

The text information may include a name, model name, a seller, a sales link, price, parent category, child category, or the like of an item. The category information may include a category table used by an external server or the external electronic device. The image information may include a photo or other visual representation of the item.

In operation 403, the processor 220 may determine the category of an item, using a first determination method and the text. According to an embodiment, the processor 220 may determine the parent category of the item, and the child category belonging to the parent category.

According to an embodiment, the first determination method may include a method of determining the category of the item as a first category when the text indicating the item includes a pre-specified first keyword associated with the first category, and a method of not determining the category of an item as the first category when the text indicating an item includes a pre-specified second keyword, which is not associated with the first category.

In operation 405, when the category of an item is determined using the first determination method, the processor 220 may perform operation 413 below.

When the category of an item is not determined using the first determination method in operation 405, in operation 407, the processor 220 may determine the category of an item, using the second determination method and the received category information on the item. According to an embodiment, the processor 220 may determine the parent category of the item and the child category belonging to the parent category.

According to an embodiment, the second determination method may be a method of determining the category of the item as the corresponding category of the pre-specified item when a text included in the received category information on the item corresponds to the category of the pre-specified item.

In operation 409, when the category of the item is determined using the second determination method, the processor 220 may perform operation 413 below.

When the category of an item is not determined using the second determination method in operation 409, in operation 411, the processor 220 may determine the category of the item, using the third determination method and the image of the item. According to an embodiment, the processor 220 may determine the parent category of an item and the child category belonging to the parent category.

According to an embodiment, the third determination method may be a method of extracting feature data of an image of an item and then determining the category of an item, using category information corresponding to the feature data of an image stored in the memory 230 and the extracted feature data of an image.

In operation 413, the processor 220 may generate a DB including information on the determined category of an item.

According to an embodiment, the processor 220 may extract the feature data of an image and attribute information of an image, using the received image. The processor 220 may extract the feature data of an image, using various algorithms (e.g., scale invariant feature transform (SIFT) algorithm).

The processor 220 may generate the DB including information on the determined category of an item, the extracted feature data of an image, and the attribute information of an image.

According to an embodiment, the generated DB may correspond to the determined parent category. Each DB may include feature data of an image of items, child category data of items, and information on items. The processor 220 may store the generated DB in the memory 230 of an electronic device or may transmit the generated DB to an external server through the communication interface 210.

Figure 5:
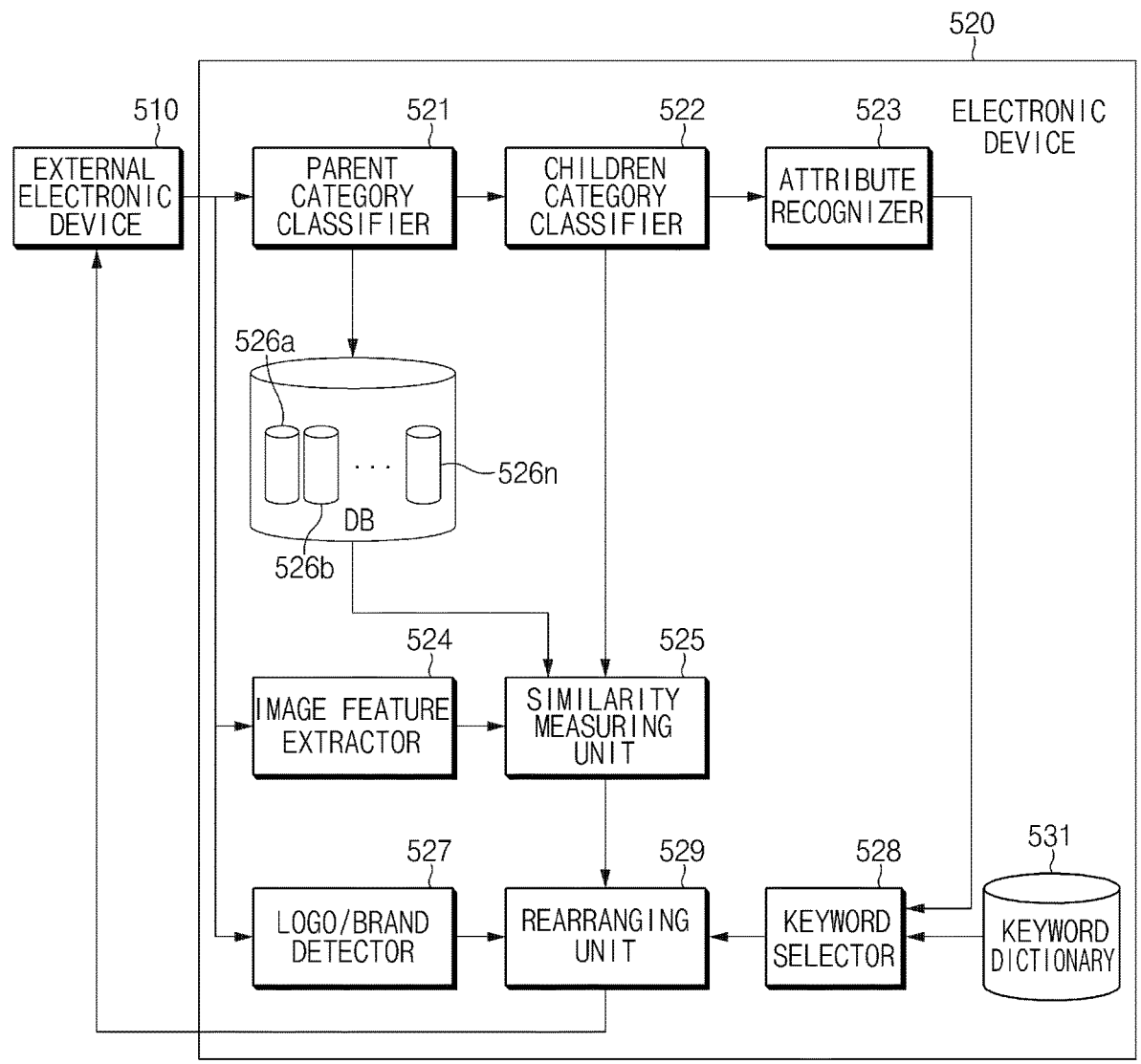
FIG. 5 is a block diagram illustrating a module of an electronic device providing information on items associated with the received image, according to an embodiment.

FIG. 5 is a block diagram illustrating a module of an electronic device that generates a DB for providing information on items associated with the received image, according to an embodiment.

The processor 220 may implement various modules by executing the instructions stored in the memory 230. For example, the processor 220 may include a parent category classifier 521, a child category classifier 522, an attribute recognizer 523, an image feature extractor 524, a similarity measuring unit 525, a logo/brand detector 527, a rearranging unit 529, and a keyword selector 528. Accordingly, it is understood that the operation performed by modules described below is performed by the processor 220.

According to an embodiment, a plurality of DBs 526*a* to 526*n* and a keyword dictionary 531 may be stored in the memory 230 of an electronic device 520.

Each of the plurality of DBs 526*a*, 526*b*, . . . to 526*n* may correspond to the parent category classified by the parent category classifier 521. For example, when there are ten types of parent categories classified by the parent category classifier 521, the number of types of the DBs 526 stored in the memory 230 may be ten. Each of the plurality of DBs 526*a* to 526*n* corresponding to the parent category may include the feature data of an image of items, the child category data of items, information on items, and the attribute information of an image of items. The information on items may include the name, seller, price, or the like of an item. The attribute information of an image may include the color, shape, pattern, or the like of an item included in an image.

The keyword dictionary 531 may include keywords corresponding to the attribute information of an image. The keyword dictionary 531 may be generated based on the attribute information extracted from the image included in the plurality of DBs 526*a* to 526*n* and the keyword extracted from the text indicating an item received from an external server (e.g., the external server 310). For example, the keyword dictionary 531 may include 'green', 't-shirt', and 'round T-Shirts' as the keyword corresponding to the green round short sleeve T-Shirts that is the attribute information of an image. According to an embodiment, an external electronic device 510 (e.g., the electronic device 101) may be a user terminal. The external electronic device 510 may transmit the image of an item to the electronic device 520 (e.g., the server 108). The external electronic device 510 may transmit the image obtained using the camera module 180 or the image stored in the memory 130 to the electronic device 520 through the communication module 190.

The parent category classifier 521 may analyze the image received from the external electronic device 510 to determine the parent category of an item. The child category classifier 522 may determine the child category of an item belonging to the parent category determined by analyzing the received image. In an embodiment, the parent category may be clothing, beauty, food, furniture, digital, and books. The child category belonging to the clothing may be women's clothing, women's shoes, men's clothing, men's shoes, and underwear. The child category belonging to digital may be a TV, a refrigerator, a camera, a mobile phone, a washing machine, and a PC. In an embodiment, when the received image is a mirrorless camera, the parent category classifier 521 may determine the parent category of an item as "digital", and the child category classifier 522 may determine the child category of an item as "camera".

The attribute recognizer 523 may analyze the received image to recognize the attribute of an item. According to an embodiment, the attribute recognizer 523 may recognize the color, shape, pattern, and the like of an item. For example, when the received image is a silver color mirrorless camera, the attribute recognizer 523 may recognize that the color of an item is silver.

The image feature extractor 524 may extract feature data of an image. According to an embodiment, the image feature extractor 524 may extract the feature data of an image, using the algorithm used by the processor 220 in operation 413 described above. For example, the image feature extractor 524 of the processor 220 may extract the feature data of an image, using the SIFT algorithm, or the like. However, the algorithm capable of being used by the image feature extractor 524 is not limited to the SIFT algorithm.

The similarity measuring unit 525 may measure the first similarity between the feature data of the image of items stored in the DB, which corresponds to the determined parent category, from among the plurality of DBs 526*a* to 526*n* and the feature data of an image of the received item. The similarity measuring unit 525 may measure the second similarity between the child category of items stored in the DB, which corresponds to the determined parent category, from among the plurality of DBs 526*a* to 526*n* and the child category of the determined second item. The similarity measuring unit 525 may select one or more items, each of which is similar to the item of the received image among items stored in the DB, which corresponds to the determined parent category, from among the plurality of DBs 526*a* to 526*n*, based on the specific first similarity and second similarity.

The similarity measuring unit 525 may determine a similarity of images and/or a similarity of categories based on feature vector information stored together with items in the DB. According to an embodiment, the feature vector information may be a value obtained by concatenating a binarization value obtained by binarizing text information extracted from an image or a classification of the image and a feature vector value of the image. According to an embodiment, the binarization value may be obtained by concatenating at least one code corresponding the classification of the image and/or the text information extracted from the image, wherein the at least one code is obtained from, for example, a table in which a ring category is 001, a necklace category is 010, a clock category is 100. The similarity measuring unit 525 can determine not only a degree of similarity of the images but also a similarity of the object types by comparing the feature vector information of the items, thereby accuracy of resulting images is improved.

According to an embodiment, when selecting one or more items, the similarity measuring unit 525 may assign a greater weight to the second similarity than the first similarity.

The logo/brand detector 527 may detect the logo and the brand name included in the image. For example, the logo/ brand detector 527 may detect the logo and the brand name from the brand name of "BEAN POLE" and the image of the T-shirt including the bicycle-shaped logo.

The keyword selector 528 may select one or more keywords, which correspond to the attribute of an item recognized by the attribute recognizer 523, from among keywords stored in the keyword dictionary 531. For example, when the color of an item recognized by the attribute recognizer 523 is blue and when the pattern is a horizontal stripe, the keyword selector 528 may select 'blue', 'line pattern', and 'horizontal line pattern' as the keyword corresponding to the attribute of an item. According to an embodiment, the one or more keywords corresponding to the attribute of an item selected by the keyword selector 528 may be used when the rearranging unit 529 assigns a high priority to items.

According to an embodiment, the keyword selector 528 may select one or more keywords, which do not correspond to the attribute of an item recognized by the attribute recognizer 523, from among keywords stored in the keyword dictionary 531. The one or more keywords that do not correspond to the attribute of an item may be used when the rearranging unit 529 assigns a low priority to items. For example, when the color of an item recognized by the attribute recognizer 523 is blue and when the pattern is a horizontal stripe, the keyword selector 528 may select the keywords 'red', 'nonpattern', and 'vertical stripes', which do not correspond to the attribute of an item, from among the keywords included in the keyword dictionary 531. The rearranging unit 529 may assign a low priority to items associated with 'red', 'nonpattern' or 'vertical line pattern' among the items selected by the similarity measuring unit 525.

The rearranging unit 529 may assign the priority to the one or more items selected by the similarity measuring unit 525, using the logo and the brand name detected by the logo/brand detector 527. For example, the rearranging unit 529 may assign a high priority to items including the same logo as the detected logo and may assign a low priority to items not including the same logo as the detected logo.

According to an embodiment, the rearranging unit 529 may assign a priority to the one or more items selected by the similarity measuring unit 525, using the keyword selected by the keyword selector 528 and may transmit information on the selected first items and information on the assigned priority to the external electronic device 510. For example, when the keyword corresponding to the attribute of an item selected by the keyword selector 528 is 'blue', the rearranging unit 529 may assign a high priority to items with a blue color. For another example, when the keyword not corresponding to the attribute of an item selected by the keyword selector 528 is 'red', the rearranging unit 529 may assign a low priority to items with a red color.

According to an embodiment, the rearranging unit 529 may assign the greater weight to the priority assigned to the first items by using the logo and the brand name than the priority assigned to the first items by using the selected keyword. For example, the priority score assigned using the selected keyword may be less than the priority score assigned using the logo and the brand name.

Hereinafter, it is assumed that an electronic device (e.g., the electronic device 104 or the server 108) of FIG. 2 performs the process of FIGS. 6 to 8B. The operation described as being performed by the electronic device may be implemented with instructions capable of being performed (or executed) by the processor 220 of the electronic device. The instructions may be stored in, for example, a computer-readable recording medium or the memory 230 of the electronic device (e.g., the electronic device 104 or the server 108) illustrated in FIG. 2. Furthermore, it may be understood that the operations of FIGS. 6 to 8B are performed by the above-described modules 521 to 525 and 527 to 529 illustrated in FIG. 5.

Hereinafter, it is assumed that the item included in the DB of the memory 230 is the first item and the item included in the received image is the second item.

Figure 6:
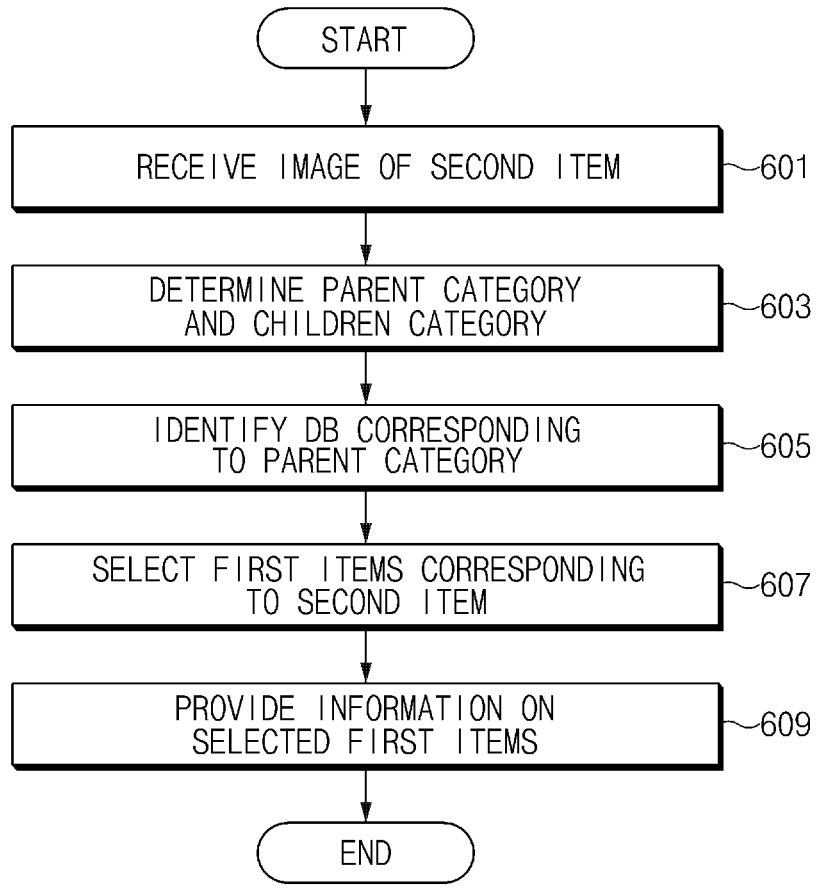
FIG. 6 is a flowchart illustrating a method in which an electronic device provides information on items to an external electronic device, according to an embodiment.

FIG. 6 is a flowchart illustrating a method in which an electronic device provides information on items to an external electronic device, according to an embodiment.

In operation 601, the processor 220 may receive the image of a second item from an external electronic device through the communication interface 210.

In operation 603, the processor 220 may determine the parent category and the child category of the second item included in the received image. According to an embodiment, the processor 220 may extract feature data from the image of the second item.

According to an embodiment, the processor 220 may further obtain attribute information of the received image of the second item. The attribute information of an image may include the color, shape, pattern, or the like.

In operation 605, the processor 220 may identify a DB, which corresponds to the determined parent category of the second item, from among a plurality of DBs.

In operation 607, the processor 220 may select one or more first items corresponding to the second item among a plurality of first items included in the identified DB, based on the feature data of an image of the second item and the determined child category of the second item. In other words, the processor 220 may select the first items corresponding to the second item among a plurality of first items, which are included in the DB corresponding to the parent category among a plurality of DBs.

According to an embodiment, the processor 220 may select one or more first items corresponding to the second item among the first items, which are included in the DB corresponding to the determined parent category of the second item and which belong to the child category in which the similarity with the determined child category of the second item is not greater than a pre-specified value. In other words, the processor 220 may select one or more first items among first items belonging to the child category similar to the child category of the second item among the first items included in the DB corresponding to the parent category. For example, when the parent category corresponding to the DB is "digital", when the child category of the first items included in the DB is a camera, a PC, and a mobile phone, and when the child category of the second item is a mobile phone, the processor 220 may measure image similarity between first items belonging to a mobile phone category among the first items included in the DB and the second item and may not measure image similarity between the first items belonging to a camera category and a PC category and the second item.

According to an embodiment, the processor 220 may select one or more first items based on the first similarity between the feature data of the image of the first items and the feature data of the image of the second item and the second similarity between the child category of the first items and the determined child category of the second item.

According to an embodiment, the processor 220 may assign the greater weight to the second similarity than the first similarity. In other words, the processor 220 may assign the greater weight to the similarity of the child category than the similarity of the image feature.

According to an embodiment, the processor 220 may select one or more first items corresponding to the second item, further based on attribute information of image of the first items and attribute information of the image of the second item. For example, when the processor 220 determines the color of the second item as blue, the processor 220 may select one or more first items similar to the second item among first items with the blue color.

According to an embodiment, when the child category of the second item included in the received image is not determined, the processor 220 may select one or more first items corresponding to the second item among a plurality of first items included in the DB, based on a DB corresponding to the determined parent category among a plurality of DBs and the feature data of the image of the second item. That is, when the child category of the second item is not determined, the processor 220 may select one or more first items based on the similarity of an image in the DB corresponding to the determined parent category.

In operation 609, the processor 220 may provide information on the selected one or more first items to an external electronic device.

According to an embodiment, information on the first items may include at least one of the name, seller, or price of the first item.

According to an embodiment, the processor 220 may provide information on the priority assigned to the first items together with information on the selected one or more first items. Hereinafter, a method of providing information on a priority and information on the selected items instead of operation 609 will be described with reference to FIGS. 7 to 8B.

Figure 7:
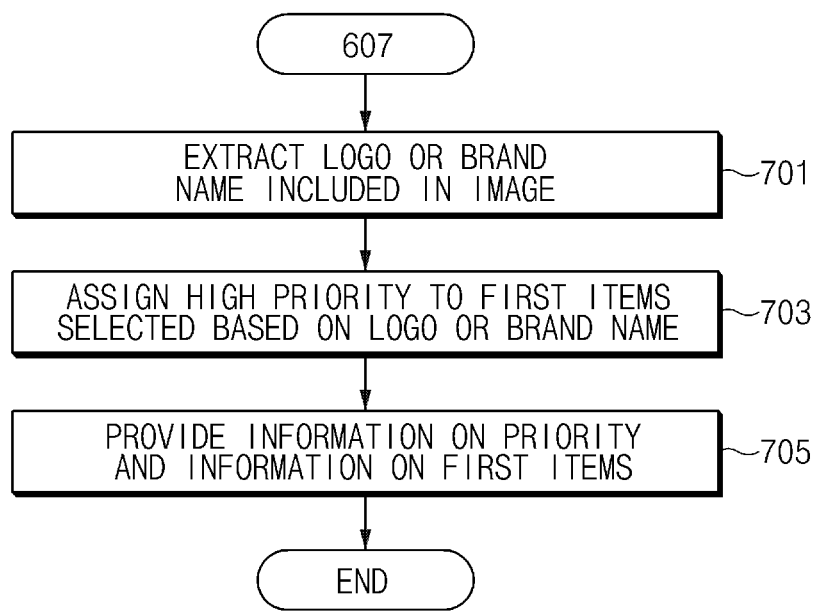
FIG. 7 is a flowchart illustrating a method in which an electronic device provides information on a priority assigned to items based on a logo or a brand name included in an image, according to an embodiment.

FIG. 7 is a flowchart illustrating a method in which an electronic device provides information on a priority assigned to items based on a logo or a brand name included in an image, according to an embodiment.

In operation 701, the processor 220 may extract at least one of the logo or the brand name included in an image of a second item.

According to an embodiment, the image of the second item may include the brand name or the logo of the second item. According to an embodiment, the processor 220 may extract the brand name through an optical character reader (OCR).

In operation 703, the processor 220 may assign a high priority to the one or more first items selected based on information on at least one of the extracted logo or the extracted brand name and the selected one or more first items.

According to an embodiment, information on the first items included in a DB may include the name, model name, or the like of the first item. The processor 220 may assign a high priority to the first item with high similarity based on the similarity with the extracted logo or brand name and the name or model in information on the first items.

In operation 705, the processor 220 may provide information on the assigned priority to an external electronic device.

Figure 8A:
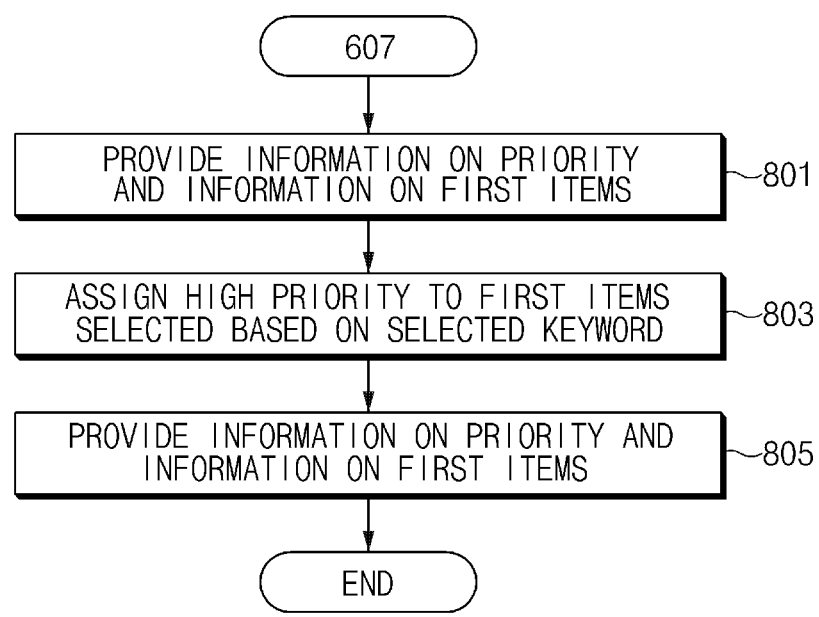
FIG. 8A is a flowchart illustrating a method in which an electronic device provides information on a priority assigned to items based on a keyword corresponding to an attribute of an item, according to an embodiment.

FIG. 8A is a flowchart illustrating a method in which an electronic device provides information on a priority assigned to items based on a keyword corresponding to an attribute of an item, according to an embodiment.

According to an embodiment, the processor 220 may obtain attribute information of the received image of a second item in operation 603.

In operation 801, the processor 220 may select one or more keywords corresponding to the obtained attribute information of an image of the second item among stored keywords.

For example, when it is obtained that the color of an item as the attribute information of an image is blue and the pattern is a horizontal stripe, the processor 220 may select 'blue' and 'horizontal line pattern' as the keyword corresponding to the attribute of an item.

In operation 803, the processor 220 may assign a high priority to the one or more first items selected based on the selected one or more keywords and information on the selected one or more first items.

According to an embodiment, information on the first items included in a DB may include the attribute information of the first item. The high priority may be assigned to the first items, the color of which is blue and the pattern of which is a horizontal line pattern, from among the first items selected using attribute information of the first items included in the DB.

In operation 805, the processor 220 may provide information on the assigned priority to an external electronic device.

Figure 8B:
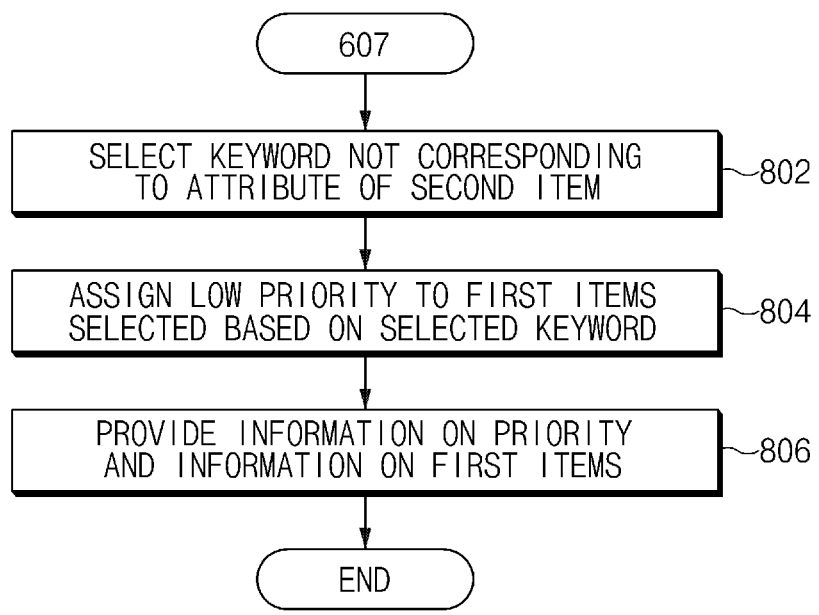
FIG. 8B is a flowchart illustrating a method in which an electronic device provides information on a priority assigned to items based on a keyword not corresponding to an attribute of an item, according to an embodiment.

FIG. 8B is a flowchart illustrating a method in which an electronic device provides information on a priority assigned to items based on a keyword not corresponding to an attribute of an item, according to an embodiment.

According to an embodiment, the processor 220 may obtain attribute information of the received image of a second item in operation 603.

In operation 802, the processor 220 may select one or more keywords not corresponding to the obtained attribute information of an image of the second item among stored keywords.

For example, when it is obtained that the color of an item as the attribute information of an image is blue and the pattern is a horizontal stripe, the processor 220 may select 'red' and 'vertical line pattern' as the keyword not corresponding to the attribute of an item.

In operation 804, the processor 220 may assign a low priority to the one or more first items selected based on the selected one or more keywords and information on the selected one or more first items.

According to an embodiment, information on the first items included in a DB may include the attribute information of the first item. The low priority may be assigned to the first items, the color of which is red and the pattern of which is a vertical line pattern, from among the first items selected in operation 607 using attribute information of the first items included in the DB.

For example, when the color of the second item recognized in operation 802 is blue and the pattern is a horizontal stripe, the keyword not corresponding to the attribute of the second item may be 'red', 'nonpattern', and a 'vertical line pattern'. In operation 804, the processor 220 may assign a low priority to the first items associated with the 'red', 'nonpattern', and 'vertical line pattern' among the first items selected in operation 607.

In operation 806, the processor 220 may provide information on the assigned priority to an external electronic device.

Figure 9A:
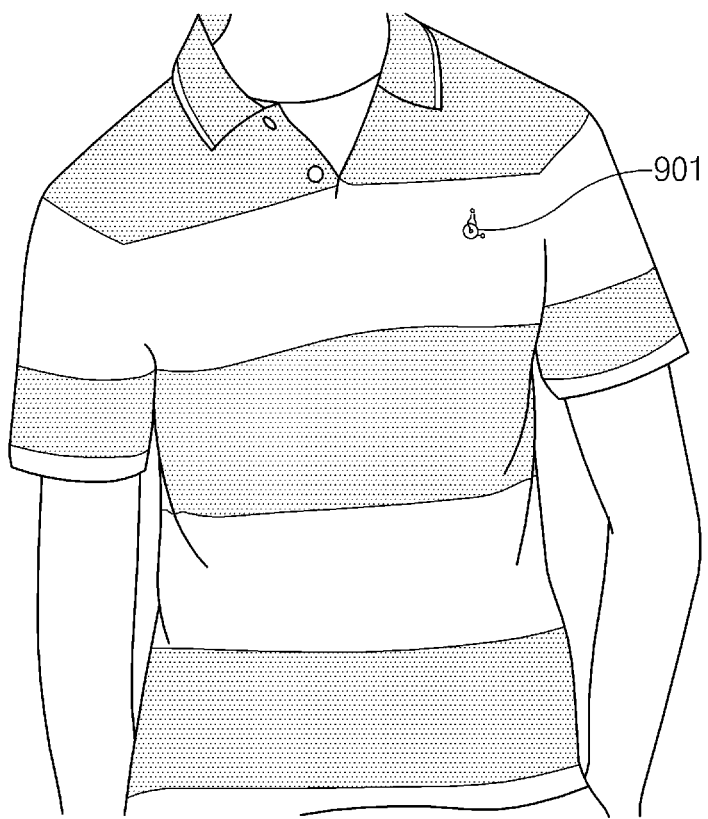
FIG. 9A illustrates an image received from an external electronic device, according to an embodiment.
Figure 9B:
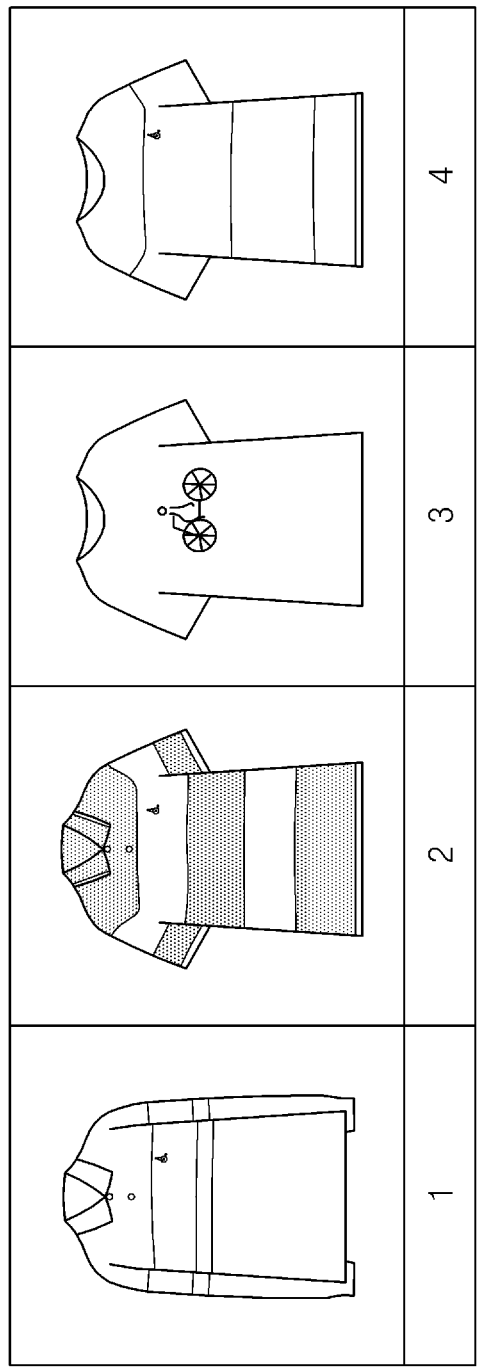
FIG. 9B is a view illustrating items to which a priority is not assigned, according to an embodiment.
Figure 9C:
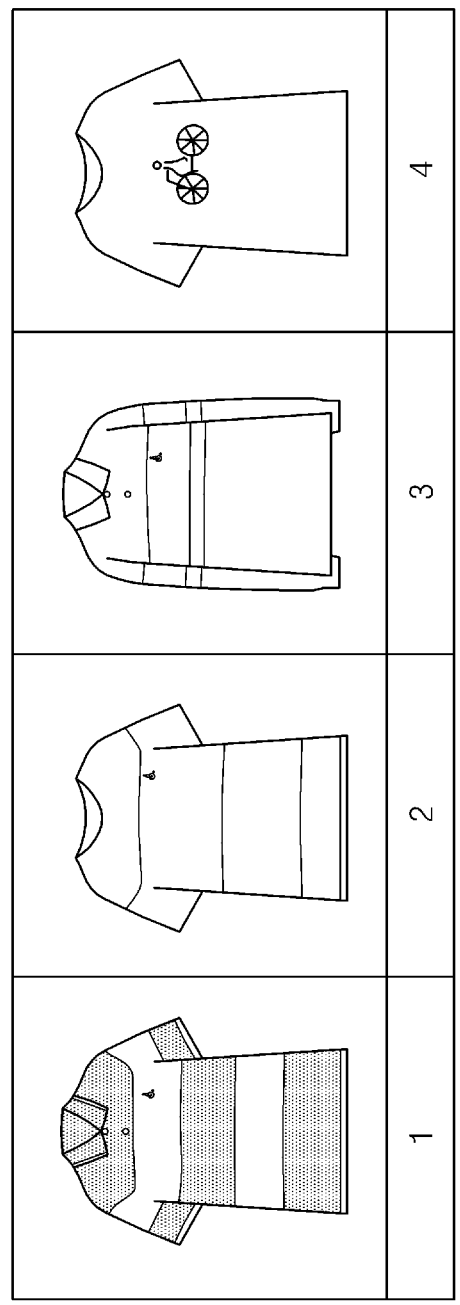
FIG. 9C is a view illustrating selected items arranged in order of a priority, according to an embodiment.

FIG. 9A illustrates an image received from an external electronic device, according to an embodiment. FIG. 9B is a view illustrating items to which a priority is not assigned, according to an embodiment. FIG. 9C is a view illustrating selected items arranged in order of a priority, according to an embodiment.

According to an embodiment, the processor 220 of an electronic device may receive the image of a second item as illustrated in FIG. 9A. According to an embodiment, the second item may include a logo 901 in which the front wheel is greater than a rear wheel, and may be short sleeve collar t-shirts including a horizontal line pattern.

According to an embodiment, the processor 220 may determine a parent category of the received image of the second item as clothing and may determine a child category as t-shirts. The processor 220 may obtain attribute information indicating that the second item is short sleeve t-shirts, has a horizontal line pattern, and includes a collar, and may extract a bicycle-shaped logo included in the second item. The processor 220 may select 'short sleeve t-shirts' and a 'collar' as the keyword corresponding to the attribute of the second item and may select 'long sleeve t-shirts' as the keyword not corresponding to the attribute of the second item.

As illustrated in FIG. 9B, the processor 220 may select first items, which are similar to the second item, from among first items in each of which the child category is t-shirts in the DB corresponding to a clothing category.

The processor 220 may assign the lowest priority to No. 3 t-shirts of FIG. 9B, based on the extracted bicycle-shaped logo and information on the first items. Furthermore, the processor 220 may assign a low priority to No. 1 t-shirts of FIG. 9B being long sleeve t-shirts, based on the keyword not corresponding to the attribute of the second item and information on the first items. The processor 220 may assign a high priority to No. 2 t-shirts of FIG. 9B being short sleeve collar t-shirts, based on the keyword corresponding to the attribute of the second item and information on the first items. As described above, when the priority is assigned the t-shirts of FIG. 9B, the processor 220 may assign a priority to the first items in order illustrated in FIG. 9C.

Referring to FIG. 9C, it may be determined that No. 1 t-shirts of FIG. 9C is the same as the t-shirts of FIG. 9A and the processor 220 may provide an external electronic device with information on a priority and information on the first items. The external electronic device may display information on the first items in order in which the image of each of the first items is most similar to the image of the second item, using the information on the first items and information on a priority.

According to an embodiment of the present disclosure, an electronic device may include a communication interface, a memory including a plurality of DBs generated based on information of a plurality of first items obtained from one or more external database DBs and classified depending on a parent category of the plurality of first items, and at least one processor electrically connected to the communication interface and the memory. The at least one processor may be configured to receive an image of a second item from an external electronic device through the communication interface, to determine a parent category and a child category of the second item, using the received image of the second item, to identify a DB corresponding to the determined parent category of the second item among the plurality of DBs, to select one or more first items corresponding to the second item among a plurality of first items included in the identified DB, based on feature data of the image of the second item and the determined child category of the second item, and to provide information on the selected one or more first items to the external electronic device. The plurality of DBs may include feature data of an image of the first items, child category data of the first items, and product information on the first items.

In an embodiment, each of the plurality of DBs may further include attribute information of the image of the first items. The at least one processor may be configured to obtain attribute information of the received image of the second item and to select the one or more first items corresponding to the second item further based on the attribute information of the image of the first items and the attribute information of the image of the second item.

In an embodiment, the attribute information of the image may include at least one of a color, a shape, or a pattern, and the at least one processor may be configured to select the one or more first items corresponding to the second item based on at least one of the color, the shape, or the pattern.

In an embodiment, the at least one processor may be configured to select the one or more first items corresponding to the second item among the plurality of first items included in the identified DB, based on the feature data of the image of the second item, when the child category of the second item included in the received image is not determined.

In an embodiment, the at least one processor may be configured to select the one or more first items corresponding to the second item among first items, which are included in the identified DB and which belong to a child category in which a similarity with the determined child category of the second item is not greater than a pre-specified value.

In an embodiment, the at least one processor may be configured to select the one or more first items based on a first similarity between the feature data of the image of the first items and the feature data of the image of the second item and a second similarity between the child category of the first items and the determined child category of the second item.

In an embodiment, the at least one processor may be configured to assign a greater weight to the second similarity than the first similarity.

In an embodiment, the information on the first items may include at least one of a name, a seller, or a price of each of the first items, and the at least one processor may be configured to provide the external electronic device with at least one of the name, the seller, or the price of each of the selected one or more first items.

In an embodiment, the at least one processor may be configured to extract at least one of a logo or a brand name included in the image of the second item, to assign a priority to the selected one or more first items based on the extracted at least one of the logo or the brand name and the information on the selected one or more first items, and to provide the external electronic device with information on the assigned priority.

In an embodiment, the memory may be configured to store keywords corresponding to attribute information of an image, and the at least one processor may be configured to obtain attribute information of the received image of the second item, to select one or more keywords corresponding to the obtained attribute information of the image of the second item among the stored keywords, to assign a priority to the selected one or more first items based on the selected one or more keywords and information on the selected one or more first items, and to provide the external electronic device with information on the assigned priority.

In an embodiment, the memory may be configured to store keywords corresponding to attribute information of an image, and the at least one processor may be configured to obtain attribute information of the received image of the second item, to select one or more keywords not corresponding to the obtained attribute information of the image of the second item among the stored keywords, to assign a priority to the selected one or more first items based on the selected one or more keywords and information on the selected one or more first items, and to provide the external electronic device with information on the assigned priority.

According to another embodiment of the present disclosure, an electronic device may include a communication interface, a memory, at least one processor electrically connected to the communication interface and the memory. The at least one processor may be configured to receive a text indicating an item, category information on the item, and an image of the item from an external electronic device through the communication interface, to determine a category of the item, using a first determination method and the text indicating the item, to determine the category of the item, using a second determination method and the received category information on the item when the category of the item is not determined using the first determination method, to determine the category of the item, using a third determination method and the image of the item when the category of the item is not determined using the second determination method, and to generate a DB including information on the determined category of the item.

In an embodiment, the determining of the category of the item may include determining a parent category of the item and determining a child category belonging to the determined parent category.

In an embodiment, the at least one processor may be configured to generate each of a plurality of DBs corresponding to the determined parent category.

In an embodiment, the first determination method may include a method of determining the category of the item as a first category when the text indicating the item includes a pre-specified first keyword associated with the first category and a method of not determining the category of the item as the first category when the text indicating the item includes a pre-specified second keyword not associated with the first category.

In an embodiment, the second determination method may be a method of determining the category of the item as a corresponding pre-specified category of the item when a text included in the received category information on the item corresponds to the pre-specified category of the item.

In an embodiment, the memory may be configured to store category information corresponding to feature data of an image, and the third determination method may be a method of extracting the feature data of the image of the item and determining the category of the item using the category information corresponding to the feature data of the image stored in the memory and the extracted feature data of the image.

According to another embodiment of the present disclosure, an electronic device may include a communication circuit, a camera module, a memory, a display, and at least one processor electrically connected to the communication circuit, the camera module, the memory, and the display. The at least one processor may be configured to transmit an image of a first item obtained through the camera module or the image of the first item stored in the memory to an external server through the communication circuit, to receive information on second items similar to the first item from the external server through the communication circuit, and to display the received information on the second items on the display. The second items may be selected based on a DB corresponding to a parent category of the first item, feature data of the image of the first item, and a child category of the first item among a plurality of second items included in the DB.

In an embodiment, the information on the second items may include at least one of a name, a seller, or a price of each of the second items.

In an embodiment, the at least one processor may be configured to further receive information on a priority corresponding to the received information on the second items through the communication circuit and to arrange the information on the second items based on received information on the priority.

The electronic device according to certain embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that certain embodiments of the disclosure and terms used in the embodiments do not intend to limit technical features disclosed in the disclosure to the particular forms disclosed herein; rather, the disclosure should be construed to cover various modifications, equivalents, or alternatives of embodiments of the disclosure. With regard to description of drawings, similar or related components may be assigned with similar reference numerals. As used herein, singular form of noun corresponding to an item may include one item or a plurality of items unless the context clearly indicates otherwise. In the disclosure disclosed herein, each of the expressions "A or B", "at least one of A and B", "at least one of A or B", "A, B, or C", "one or more of A, B, and C", and "one or more of A, B, or C" may include any and all combinations of one or more of the associated listed items. The expressions "a first", "a second", "the first", or "the second", used in herein, may be merely used to distinguish a component from the other components and do not limit the corresponding components to other aspects (e.g., importance or order). It should be understood that when a component (e.g., a first component) is referred to as being "connected," or "coupled," to another component (e.g., a second component) with or without the terms such as "operatively" or "communicatively", the component may be directly (e.g., wired) or wirelessly connected or coupled to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. According to an embodiment, the "module" may be implemented with an application-specific integrated circuit (ASIC).

Various embodiments of the disclosure may be implemented by software (e.g., the program 140) including one or more instructions stored in a machine-readable storage media (e.g., an internal memory 136 or an external memory 138) readable by a machine (e.g., the electronic device 101). For example, a processor (e.g., the processor 120) of the machine (e.g., the electronic device 101) may call at least one instruction among one or more instructions stored in the storage medium and may execute the instruction. This means that the machine is to be operated to perform at least one function in accordance with the at least one instruction being called. The one or more instructions may include a code generated by a compiler or a code to be executed by an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to certain embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed (e.g., download or upload) through an application store (e.g., a Play Store™) or between two user devices (e.g., smartphones) directly or through on-line. In the case of online distribution, at least a portion of the computer program product may be temporarily stored or generated in a machine-readable storage medium such as a memory of a manufacturer's server, an application store's server, or a relay server.

According to certain embodiments, each component (e.g., the module or the program) of the above-described components may include one entity or a plurality of entities. According to certain embodiments, one ore mode components among the above-described components or operations may be omitted, or one or more other components or operations may be added. Alternatively or additionally, some components (e.g., the module or the program) may be integrated in one component. In this case, the integrated component may perform the same or similar one or more functions of each component of the plurality of components performed by each corresponding components among the plurality of components prior to the integration. According to certain embodiments, operations performed by a module, a programming, or other components may be executed sequentially, in parallel, repeatedly, or in a heuristic method. Also, at least some operations may be executed in different sequences, omitted, or other operations may be added.

According to embodiments disclosed in the disclosure, the search speed may be improved by reducing a search range through the category classification of an item.

Furthermore, the accuracy of a search may be improved using child category information of an item and attribute information of an item.

Besides, a variety of effects directly or indirectly understood through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device comprising:
    a communication interface;
    a memory including a plurality of databases, wherein each of the plurality of the databases is classified by parent category and includes a plurality of set of items, and wherein each of plurality of the set of items is classified by child category includes images of each of a plurality of items; and
    at least one processor electrically coupled to the communication interface and the memory, configured to:
        receive a search image of a search item from an external electronic device through the communication interface;
        determine a target parent category and a target child category of the search item, using the received search image of the search item;
        extracting, based on the search image, a plurality of attributes of the search item different from the target parent category and the target child category;
        identify a first database from among the plurality of the databases matching the determined target parent category of the search item;
        determine a first set of items from among the plurality of set of items included in the first database as a search range, and omit a second set of items from among the plurality of set of items included in the first database from the search range, wherein the first set of items include the images included in a set of items that matches with the target child category from among the plurality of set of items in the first database and wherein the second set of items include at least images included in others of set of items that does not matches with the target child category from among the plurality of set of items in the first database;
        identify a subset of the first set of items that matches with the search image based on a result of the comparing the search image with images included in the first set of items;
        assigning a respective priority value to each of the subset of the first set of items based on a result of the comparing the extracted plurality of attributes image with images included in the subset of the first set of items; and
        transmit first information on the identified subset of the first set of items and second information on the respective priority value to the external electronic device,
        wherein the first information includes a search result item fully matching with the search item and a plurality of mismatch search result items that do not fully match with the search item via differences with the extracted plurality of attributes, and wherein the plurality of mismatch search result items is displayed through the external electronic device, according to a hierarchical ranking determined via the assigned respective priority value of each of the plurality of mismatch search result items.

2. The electronic device of claim 1, wherein each of plurality of the set of items further includes attribute information for each of a plurality of items each of the stored images, and
    wherein identifying the subset of the first set of items further includes matching the plurality of attributes of the search image with corresponding attributes information of images included in the first set of items.

3. The electronic device of claim 2, wherein the attribute information utilized for the matching includes at least one of a color, a shape, or a pattern included in the received search image.

4. The electronic device of claim 1, wherein the at least one processor is further configured to:
    when the target child category of the search item is not determined, identify the subset of the first set of items that matches with the search image based on a result of the comparing the search image with images included in the first set of items and the second set of items included in the first database.

5. The electronic device of claim 1, wherein the memory further stores text information for the each of a plurality of items, including at least one of a name, a seller, or a price for each of the stored items, and wherein the at least one processor is configured to:

transmit, to the external electronic device, at least one of the name, the seller, or the price for each item of the identified subset of the first set of items.

6. The electronic device of claim 1, wherein the at least one processor is configured to:

extract at least one of a logo image or a brand name included in the search image of the search item as the plurality of attributes of the search item.

7. The electronic device of claim 1, wherein the at least one processor is configured to:

extract visual attributes of at least one item included in the search image of the search item as the plurality of attributes of the search item.

8. The electronic device of claim 7, wherein the at least one processor is configured to:

store, in the memory, keywords indicating visual attributes for the each of a plurality of items; and extract one or more of the stored keywords indicating any visual attributes that do not match the extracted visual attributes as the plurality of attributes of the search item.

9. A method performed in an electronic device, the method:

storing a plurality of databases, wherein each of the plurality of the databases is classified by parent category and includes a plurality of set of items, and wherein each of plurality of the set of items is classified by child category includes images of each of a plurality of items;

receiving a search image of a search item from an external electronic device;

determining a target parent category and a target child category of the search item, using the received search image of the search item;

extracting, based on the search image, a plurality of attributes of the search item different from the target parent category and the target child category;

identifying a first database from among the plurality of the databases matching the determined target parent category of the search item;

determining a first set of items from among the plurality of set of items included in the first database as a search range, and omit a second set of items from among the plurality of set of items included in the first database from the search range, wherein the first set of items include the images included in a set of items that matches with the target child category from among the plurality of set of items in the first database and wherein the second set of items include at least images included in others of set of items that does not matches with the target child category from among the plurality of set of items in the first database;

identifying a subset of the first set of items that matches with the search image based on a result of the comparing the search image with images included in the first set of items;

assigning a respective priority value to each of the subset of the first set of items based on a result of the comparing the extracted plurality of attributes image with images included in the subset of the first set of items; and transmitting first information on the identified subset of the first set of items and second information on the respective priority value to the external electronic device, wherein the first information includes a search result item fully matching with the search item and a plurality of mismatch search result items that do not fully match with the search item via differences with the extracted plurality of attributes, and wherein the plurality of mismatch search result items is displayed through the external electronic device, according to a hierarchical ranking determined via the assigned respective priority value of each of the plurality of mismatch search result items.

\* \* \* \* \*